United States Patent [19]

Taarning

[11] Patent Number: 4,644,439

[45] Date of Patent: Feb. 17, 1987

[54] FAST-ACTING SPARK-OVER DETECTOR

[75] Inventor: Claus E. Taarning, Copenhagen, Denmark

[73] Assignee: F. L. Smidth & Co. A/S, Denmark

[21] Appl. No.: 667,545

[22] Filed: Nov. 2, 1984

[30] Foreign Application Priority Data

Nov. 9, 1983 [GB] United Kingdom ................ 8329845

[51] Int. Cl.$^{4}$ ............................................ H02H 3/093

[52] U.S. Cl. ....................................... 361/87; 361/94; 361/100; 361/235; 323/903

[58] Field of Search ..................... 361/2, 5, 87, 93, 94, 361/100, 235; 363/54; 323/903; 55/139

[56] References Cited

U.S. PATENT DOCUMENTS

| | | | |
|---|---|---|---|
| 3,865,438 | 2/1975 | Boksjo et al. | 363/54 |
| 3,974,436 | 10/1976 | Timpe | 363/54 |
| 4,084,206 | 4/1978 | Leowald et al. | 363/54 X |
| 4,503,477 | 3/1985 | Henriksen et al. | 361/235 X |
| 4,536,816 | 8/1985 | Matsumura et al. | 363/54 X |

FOREIGN PATENT DOCUMENTS

EP66950 12/1982 European Pat. Off. ................ 361/5

*Primary Examiner*—A. D. Pellinen
*Assistant Examiner*—Derek S. Jennings
*Attorney, Agent, or Firm*—Brumbaugh, Graves, Donohue & Raymond

[57] ABSTRACT

A spark-over detector for an electrostatic precipitator has a current sensor (3) which provides a signal (a) which is differentiated twice to produce a signal (c). If the level of the signal (c) is above a predetermined level then a level-detecting circuit (7) passes a signal (d) to an AND-gate (8). A second level detecting circuit (9) receives the signal (a) and if this signal is above a predetermined level passes the signal (e) to a timing circuit (10) which provides a signal (f) from a first preset time after having received the signal (e) until a second preset time after the signal (e) has ceased. Thus, if a spark over starts to occur signals (d) and (f) occur simultaneously and the AND-gate produces an output signal (g) which can be used to trigger the thyristor switch circuit of the pulse generator to conduction to prevent thyristor damage or destruction.

3 Claims, 2 Drawing Figures

FAST-ACTING SPARK-OVER DETECTOR

The invention relates to a fast-acting spark-over detector for detection of spark-overs in a high tension pulse-energized electrostatic precipitator.

In a pulse-energized electrostatic precipitator the high tension pulses across the precipitator are generated by triggering of a contact element, usually a thyristor or a circuit consisting of thyristors connected in series and/or in parallel. When the pulse has reached its maximum the current in the thyristors ceases, and after a certain time, the turn-off time, the thyristors will be blocking in their forward direction, until they are triggered anew to release a new pulse.

If a spark-over occurs after the current in the thyristors has ceased, but before the turn-off time is reached, the thyristors will become biased in their forward direction, and a current will be passed through the partly blocked thyristor, which means that the current is concentrated in individual parts of the thyristor semiconductor chip. Consequently the chip will be damaged or destroyed.

From U.S. Pat. No. 3,865,438 it is known to trigger a thyristor for renewed conduction if a forward bias is detected during the turn-off time. By this means the above described destructive current concentration is avoided.

In the case of spark-overs in a pulse-energized electrostatic precipitator the forward bias and consequently the current through the thyristor of the pulse generator will increase so rapidly that a re-ignition, which is initiated when a forward bias is detected, does not become effective until after the current has already increased to damaging levels.

EP-A-0066950 describes a method according to which a re-ignition of the thyristor of the pulse generator is established, not by detecting the forward bias itself within the turn-off time, but by detecting an event, i.e. a spark-over in the precipitator during a pulse, which is known to cause such bias.

According to EP-A-0066950 such a spark-over during the pulses decay can be detected by monitoring the current in the pulse generator circuit, as the current in this circuit flows in one direction during the pulse rise and in the opposite direction during the pulse decay.

However, if a spark-over occurs during the pulse decay, the current assumes the direction it had during the pulse rise. This change of direction means that the thyristor becomes forward biased.

By taking a signal from an auxiliary winding of a saturable reactor inserted in the current circuit of the pulse generator a signal can be obtained immediately before the current changes direction, whereby measures can be taken for re-ignition even before the bias in the direction of conduction of the thyristor is a reality.

An object of the invention is to provide a circuit, which by sensing the current in the pulse circuit detects a spark-over already as it is developing. This makes it possible to establish reignition of thyristors well before the current in the pulse circuit changes direction and biases the thyristor in its forward direction.

According to the present invention a spark-over detector comprises a current sensor which provides a voltage signal proportional with the current in the pulse circuit, a first differentiation unit in which the current-representing voltage signal is differentiated, a second differentiation unit, in which the output signal from the first differentiation unit is differentiated, a first level-detecting circuit, which transmits a signal to one input of an AND-gate when the output signal from the second differentiation unit is above a preset level, and a second level-detecting circuit which transmits a signal to a timing circuit as long as the current-representing voltage is above a preset level, the timing circuit transmitting a signal to a second input of the AND-gate from a first preset time after having received a signal from the second level circuit to a second preset time after the said signal has been received or after said signal has ceased, and the AND-gate outputting a signal when there are simultaneous signals on its inputs to indicate that a spark-over is developing.

Preferably, the current sensor is a high-frequency transformer, the primary winding of which is connected in series in the pulse circuit of the pulse generator, and across the secondary winding of which is connected a parallel resistance across which the current-representing voltage signal is provided.

The output of the spark-over detector, i.e. the output from its AND-gate, may appropriately be connected through a suitable amplifier and transformer, to the trigger circuit of a thyristor which supplies a cable ignition system for the thyristor switch of the pulse generator.

One example of a spark-over detector according to the invention will now be described with reference to the accompanying drawings in which.

Figure 1:
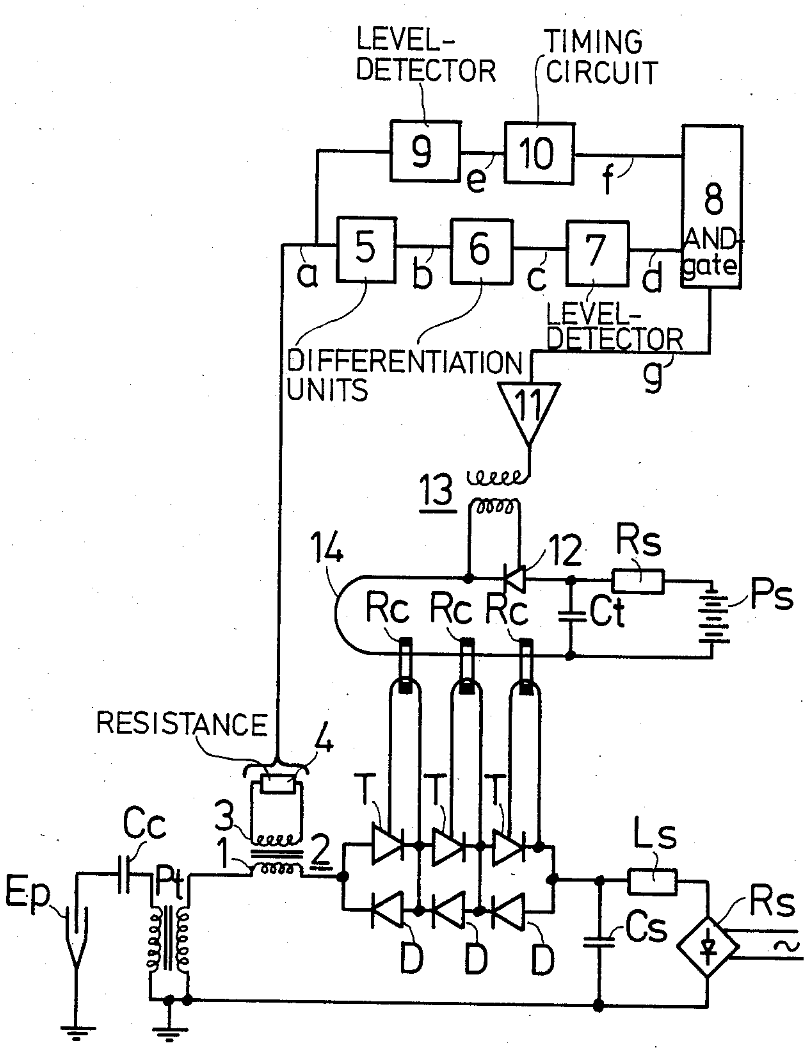
FIG. 1 shows a block diagram of a spark-over detector.

FIG. 1 shows a pulse circuit comprising a rectifier system Rs converting an AC main into DC. The DC is led through a series inductance Ls for loading a storage capacitor Cs. The storage capacitor may be discharged to provide a pulse current through a pulse transformer Pt from the secondary winding of which a high tension pulse is led through a coupling condener Cc to the emission electrode of an electrostatic precipitator Ep.

The discharge of the storage condenser is obtained through triggering the thyristors T in a column of anti-parallelly coupled thyristors T and diodes D. The use of such a column is necessitated by the fact that a single thyristor or diode cannot alone block for the voltage over the column. The column is here only shown schematically as it further comprises capacitors and resistances to distribute the voltage drop uniformly over the column.

To trigger all the thyristors in the column simultaneously a cable firing system 14 may be used. In such a system the trigger circuits of the thyristors are each coupled to a winding on an individual ring core transformer and a cable is led through all the ring cores. A pulse current through the cable will then induce trigger current in all the individual trigger circuits of the thyristors in the column.

In FIG. 1 is shown only the trigger system for an emergency firing system. A trigger condenser Ct charged from a DC power supply Ps through a series resistance Rs. When a thyristor 12 is triggered the condenser Ct is discharged through a cable passing through ring cores Rc and a trigger current is induced in the trigger circuits of the thyristors T.

A primary winding 1 of a high frequency transformer 2 is coupled in the pulse circuit. Consequently, a voltage occurs across the secondary winding 3, which is loaded with a resistance 4, the voltage being proportional to the current passing through the pulse circuit. The voltage signal, calculated in relation to a fixed reference value is designated a.

The voltage signal a is transmitted to a first differentiation unit 5 in which it is differentiated to produce a signal b, which is also differentiated in a second differentiation unit 6 to produce a further signal c, the size of which is checked by a level-detecting circuit 7, which transmits a signal d to one of the inputs of an AND-gate 8 when the value of signal c is above a preset level.

Simultaneously, the level of the signal a is sensed in a level-detecting circuit 9 which transmits a signal e as long as the value of the signal a is above a preset level. The signal e is transmitted to a timing circuit 10 which provides a signal f from a time $t_1$ after it receives the signal e, to a time $t_2$ after this signal has ceased. The signal f is passed to the second input of the AND-gate 8, and consequently a signal g will be provided at the output of the AND-gate when the signals d and f occur simultaneously.

As the signal g, as it will be explained later on, occurs when a spark-over is developing, this signal can be amplified in an amplifier 11 so that it can be used as a trigger signal for a thyristor 12 in a cable ignition system, which ignites the set of thyristors, connected in series and/or in parallel, which constitute the thyristor switch element of the pulse generator.

Figure 2:
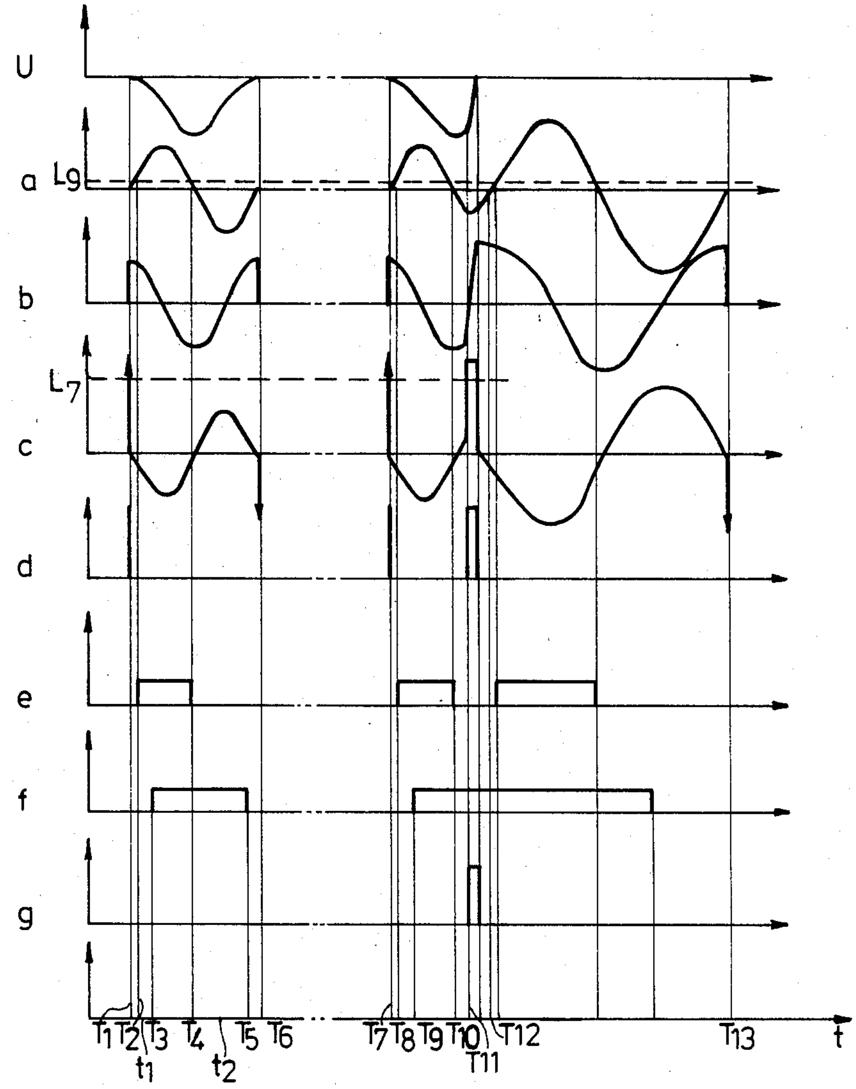
FIG. 2 shows the relationship between various of the signals in the detector shown in FIG. 1 during a normal pulse and during a spark over.

FIG. 2 shows the levels of the signals a to g when using the circuit described in FIG. 1 in connection with an energy recovering pulse generator circuit such as the one described in GB-A-1544105. In this a pulse is generated by a storage capacitor which, by triggering of a thyristor switch element, sends a current through a pulse transformer or direct to the emission electrode of an electrostatic precipitator to cause a momentary increase in its negative voltage, this voltage increase being removed shortly after, as the current, as a result of suitably coupled inductive components, changes direction. This change of direction contributes, through a diode coupled parallel with the thyristor but having a direction of conduction opposite to that of the latter, to a recharging of the storage capacitor.

Additionally, in FIG. 2, which shows the signals during both a normal pulse and during a pulse during the decay of which a spark-over occurs, the generated pulse voltage U is shown.

The signal a is a voltage signal representing the current in the pulse circuit. This voltage signal is calculated as positive when the current flows in the forward direction of the tyristor and as a negative when the current flows in the opposite direction. i.e. in the forward direction of the return diode.

The signal b which appears when differentiating the signal a, is zero between the pulses, but increases rapidly, theoretically instantaneously, at the start of the pulse to the time $T_1$, to a level corresponding to a constant multiplied by the differential coefficient of the curve of the signal a, and drops correspondingly fast to zero at the end of the pulse to the time $T_6$. Such fast changes entail that the signal c, which appears from differentiating the curve for the signal b, starts and ends with short pulses, Dirac-pulses, which approach plus or minus infinity respectively. The positive one of these Dirac-pulses, will exceed the level $L_7$ preset in the level-detecting circuit 7 and cause an output signal d therefrom, which output signal is transmitted to the AND-gate 8.

At the time $T_2$ the signal a will exceed the level $L_9$ preset in the level-detecting circuit 9, so that this circuit gives off a signal e to the timing circuit 10, which after a preset time $t_1$, at the time $T_3$, gives off a signal f to the second input of the AND-gate.

At the time $T_4$ the signal a falls below the level $L_9$, and immediately thereafter the current through the thyristor of the pulse generator becomes zero.

At the time $T_4$ the input signal e to the timing circuit ceases. However, the timing circuit is arranged to provide the output signal f continuously for a time $t_2$ after the signal e has ceased. The time $t_2$ is chosen so that the signal f continues for at least the duration of the time of recovery of the thyristor of the pulse generator, after the current in the said thyristor has ceased at thge pulse maximum. At the time $T_5$ the time $t_2$ has lapsed, and the output signal f from the timing circuit 10 ceases. It is seen that the signals d and f at no point occur simultaneously during a normal pulse, and consequently cause no output signal from the AND-gate 8.

In a pulse which starts at the time $T_7$ the level $L_9$ is exceeded and the signal e is given off at the time $T_8$. At the time $T_9$ the timing circuit 10 gives off the signal f. At the time $T_{10}$ the signal a drops below the level $L_9$, and the signal e ceases. Shortly afterwards, the current in the pulse circuit of the pulse generator and the current through the thyristor cease, while the current against the forward direction of the thyristor flows through the return diode.

However, at the time $T_{11}$ a spark-over develops which manifests itself as a quick drop in the pulse votage U. During this drop the pulse current and consequently the voltage signal a change rapidly, almost amounting to a discontinuous change. Consequently the curve b representing the signal first derivative from said signal, appears as an almost vertical line, and the curve c, which appears from differentiation of b, shows a constant high value, which is above the level $L_7$ preset by the level circuit 7, the said level being set so that with the exception of the Dirac-pulses at the start of a pulse the level is not exceeded by the normally occurring levels of c.

The level circuit 7 gives off the signal d to the AND-gate which is still receiving the signal f from the timing circuit. As a result, the AND-gate outputs a signal g, which, via an amplifier 11 and transformer 13, triggers the thyristor 12 in a cable ignition unit of the thyristors T of the pulse generator. As can be seen, the signal g is given off even before the current in the pulse circuit has changed direction, so that the thyristor of the pulse generator can be triggered for conduction before being biased in its direction of conduction at the time $T_{12}$. It is ensured that the triggering spans a certain time interval, so that the thyristor is still supplied with trigger voltage when at the time $T_{12}$ it is biased in the forward direction.

The further course of the signals shown is a result of the switch element of the pulse generator after ignition of the thyristor. The electrostatic precipitator during the spark-over is considered as short-circuited. An oscillation occurs in the oscillatory circuit formed by the storage condensor and the inductances of the generator circuit. this oscillation ceases at the time $T_{13}$, as the thyristor of the pulse generator during the latter part of the oscillation is biased in the reverse direction and is turned off.

I claim:

1. A spark-over detector for detection of spark-overs in an electrostatic precipitator, said detector comprising: a pulse circuit, a current sensor, said sensor providing a current-representing voltage signal proportional with the current in said pulse circuit;

a first differentiation unit receiving said current-representing voltage signal, to differentiate said voltage signal and to provide a first output signal;

a second differentiation unit receiving said first output signal from said first differentiation unit, to differentiate said first output signal and provide a second output signal;

a first level-detecting circuit providing a third output signal when said second output signal is above a preset level;

and AND-gate, said AND-gate having a first and second inputs, said first input receiving said third output signal;

a second level-detecting circuit providing a fourth output signal as long as said current-representing voltage is above a preset level;

and a timing circuit receiving said fourth output signal and transmit a fifth signal to said second input of said AND-gate throughout a period starting at a first preset time after said fourth output signal has been received from said second level-detecting circuit and ending at a second preset time after said fourth signal has been received or after said fourth signal has ceased;

the said AND-gate outputting a signal when there are simultaneous signals on its said first and second inputs, thereby to indicate that a spark-over is developing.

2. A spark-over detector according to claim 1, wherein said detector is operably connected to said pulse circuit and wherein said current sensor comprises a high-frequency transformer, said transformer having a primary and a secondary winding, said primary winding being connected in series in said pulse circuit; and further comprising a parallel resistance, said resistance being connected across said secondary winding, said current-representing voltage signal being provided across said resistance.

3. A spark-over detector according to claim 1 or claim 2, in combination with a pulse generator for an electrostatic precipitator, said pulse generator having a cable ignition system, said cable ignition system having a thyristor trigger and an amplifier and transformer feeding said thyristor trigger, wherein said output signal of said AND-gate of said spark-over detector is connected through said amplifier and transformer to said thyristor trigger.

* * * * *

UNITED STATES PATENT AND TRADEMARK OFFICE
CERTIFICATE OF CORRECTION

PATENT NO. : 4,644,439

DATED : Feb. 17, 1987

INVENTOR(S) : Claus E. Taarning

It is certified that error appears in the above-identified patent and that said Letters Patent is hereby corrected as shown below:

Column 4, lines 33-34, "votage" should read --voltage--; Column 5, line 18, "and AND-gate" should read --an AND-gate--

Signed and Sealed this

Eighth Day of September, 1987

*Attest:*

DONALD J. QUIGG

*Attesting Officer* *Commissioner of Patents and Trademarks*